Nov. 15, 1966 G. T. BERGEMANN 3,286,183
SINGLE SIDEBAND CARRIER RECEIVER SYSTEM WHICH PRODUCES AN ACCURATELY PHASED CARRIER INJECTION SIGNAL
Filed May 6, 1963
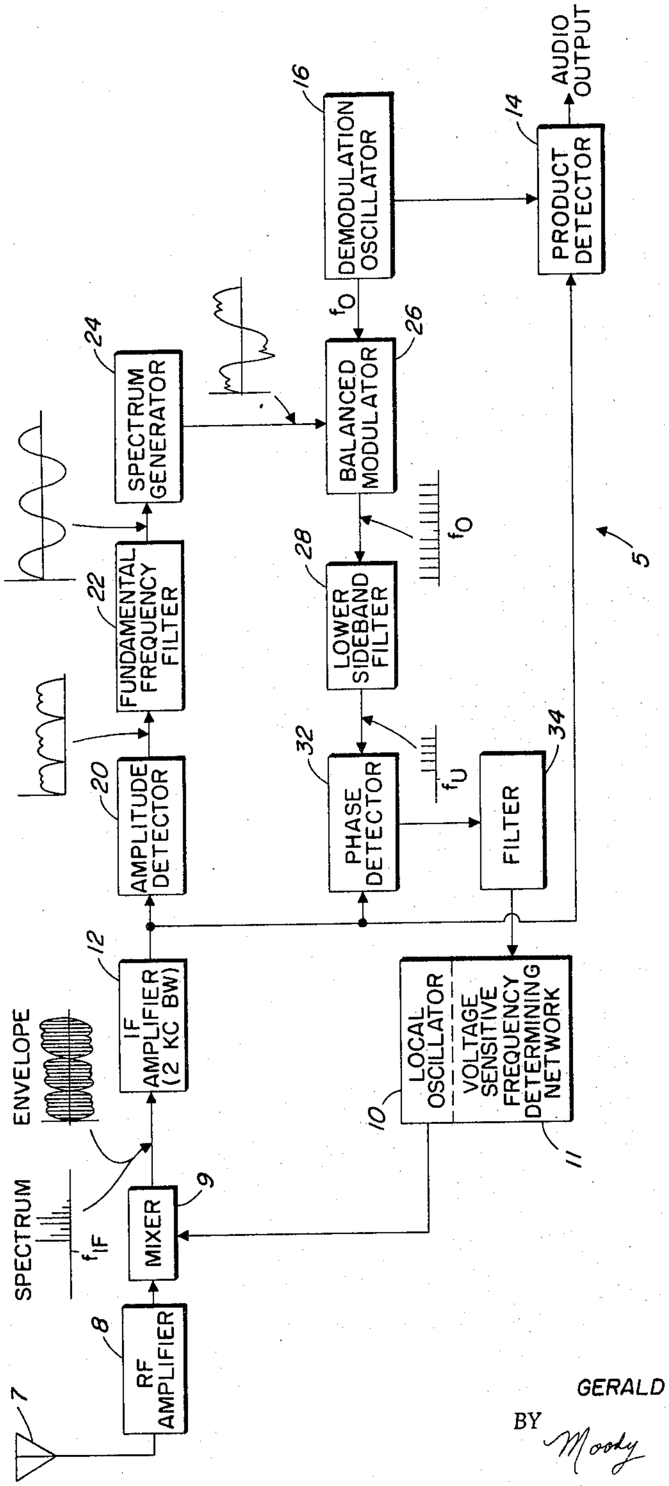
INVENTOR.
GERALD T. BERGEMANN
BY Moody and Harris
ATTORNEYS United States Patent Office 3,286,183

Patented Nov. 15, 1966

3,286,183

SINGLE SIDEBAND CARRIER RECEIVER SYSTEM WHICH PRODUCES AN ACCURATELY PHASED CARRIER INJECTION SIGNAL

Gerald T. Bergemann, Cedar Rapids, Iowa, assignor to Collins Radio Company, Cedar Rapids, Iowa, a corporation of Iowa Filed May 6, 1963, Ser. No. 278,202
7 Claims. (Cl. 325—329)

This invention relates to a single sideband suppressed carrier receiver system and more particularly to such a system having improved automatic means for maintaining reinsertion of the carrier in the proper phase to thereby achieve quality product demodulation.

Single sideband transmission is, as is well known in the art, a method of signal transmission in which one sideband is transmitted while the other sideband is suppressed. While the carrier may be transmitted in such a system, it has been found more desirable, in order to gain full power advantages, to suppress the carrier and thereby concentrate the power in the one transmitted sideband.

When utilizing a suppressed carrier type of intelligence transmission, a problem is obviously presented since the original carrier is not available for reinsertion purposes at the receiver. It is evident that the receiver must therefore include means for producing a carrier of the proper frequency and reinserting this carrier in the proper phase in order to derive the intelligence originally transmitted. While many schemes have been proposed and/or utilized in attempting to accomplish this desired end, no such scheme, now known, has been completely successful.

One of the better schemes now known in the art for controlling the reinsertion oscillator includes means for comparing the phase of the modulation products appearing at the output of a synchronous detector with the envelope of the modulation of the received signal appearing at the output of an envelope detector.

This invention also includes phase comparison means but the inputs thereto are quite different from that taught in the prior art. This invention features utilization of the original spectrum of frequencies of the received signal, appearing at the output of a mixer, as one input to the phase comparison means, and a synthesized spectrum of frequencies generated after deriving the fundamental frequency of the received voice modulation as the other input to said phase comparison means.

It is known that the average voice has a fundamental frequency of between 80 and 400 cycles per second, while the remainder of the voice spectrum consists of harmonics of the fundamental. This redundancy makes it permissible to dispense with transmission of the fundamental frequency of voice, as is often done in modern communication systems. In fact, where the fundamental is as low as 100 cycles per second, neither the first nor the second harmonic are transmitted in many presently used systems since the passband of many conventional transmitters does not extend below 200 cycles per second.

It is another feature of this invention that the improved receiver system provided has the capability of deriving the fundamental frequency of voice modulation even though not originally transmitted. This fundamental is then utilized to produce a synthesized spectrum of frequencies for phase comparison with the original spectrum of frequencies appearing at the output of the mixer stage.

It is therefore an object of this invention to provide an improved single sideband suppressed carrier receiver system having automatic means for maintaining the reinserted carrier in the proper phase to achieve quality product demodulation.

It is another object of this invention to provide an improved suppressed carrier receiver system having automatic means for phase control of the reinserted carrier which includes means for deriving the fundamental frequency of voice modulation on a received signal and generating a synthesized spectrum of frequencies for comparison with the original spectrum of frequencies present at the output of the receiver mixer stage.

More particularly, it is an object of this invention to provide an improved single sideband suppressed carrier receiver system that includes means for determining the fundamental frequency of voice modulation on a received signal, means responsive to said fundamental frequency for generating a synthesized spectrum of frequencies, and phase comparison means for comparing the synthesized spectrum with the original spectrum of frequencies of said received signal present at the output of the receiver mixer stage, said phase comparison means producing an error output signal if the corresponding lines of said spectrums of frequencies fail to coincide.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawing illustrates one complete example of the embodiment of the invention according to the best mode so far devised for the practical application of the principles thereof, and in which the single figure shown in a block diagram presentation of the single sideband suppressed carrier receiver system of this invention.

As shown in the drawing, the numeral 5 refers generally to the receiver system, which includes, as is conventional, an antenna 7 an R.F. amplifier 8 and a mixer 9. Mixer 9 receives a second input from a high frequency local oscillator 10, the output frequency of which is controlled by a voltage sensitive frequency determining network 11. As is conventional, network 11 may include, for example, a Varicap (not shown) to make the network voltage sensitive, and the output frequency is maintained at a predetermined value (for example, 455 kc.) either above or below the carrier frequency of the received signal.

The difference frequency output from mixer 9 (referred to hereinafter as the IF frequency output) is coupled through conventional IF amplifier 12 (preferably having a two kilocycle bandwidth as indicated on the drawing) to product detector 14.

Product detector 14 receives a second input from demodulation oscillator 16, which oscillator has an output frequency equal to that of the chosen IF carrier frequency (which might be 455 kc., for example) and produces an audio output signal for utilization purposes, for example, to an amplifier and loud speaker (not shown).

The output from IF amplifier 12 is also coupled to an amplitude detector 20 for detection of the envelope of the output signal from the mixer 9. The output from amplitude detector 20 is coupled to filter 22, which filter is tuned to pass only a predetermined small frequency range that includes the fundamental frequency only of the voice modulation envelope detected by detector 20. This fundamental frequency extends for an average male voice from about 100 to 200 cycles per second, and for an average female voice from 200 to 400 cycles per second as brought out hereinabove.

The fundamental frequency thus developed is coupled to conventional spectrum generator 24, which generator produces, in response to the fundamental frequency, a spectrum of frequencies which are then coupled to balanced modulator 26. Balanced modulator 26 also receives the output signal from demodulation oscillator 16. As is conventional, this produces a double sideband suppressed carrier signal at the output of balanced modulator 26, one sideband of which may then be eliminated by coupling this signal through sideband filter 28. As indicated in the drawing, filter 28 eliminates the lower sideband so that only the upper sideband appears at the output of filter 28. It is to be appreciated, of course, that if the lower sideband appeared in the received signal, then the upper sideband should be eliminated by sideband filter 28.

The output from sideband filter 28 is coupled to phase detector 32, which detector also receives the output of IF amplifier 12, so that the synthesized spectrum of frequencies generated by generator 24 is compared with the original spectrum of frequencies present at the output of mixer 9. Thus, each individual spectrum line of one spectrum will beat with its corresponding line in the other spectrum so that a D.C. output (error voltage) is produced by phase detector 22 that is proportional to the phase difference therebetween. This D.C. error voltage is coupled through filter 34 to the voltage sensitive element of frequency determining network 11 to adjust local oscillator 10 for phase coincidence.

In operation, if the receiving system of this invention receives a single sideband signal containing two audio tones (harmonics of a fundamental that is not transmitted), the waveform (after reduction to the IF frequency range at mixer 9) will consist of the addition of these two spectrum lines to produce a spectrum of frequencies, as indicated, for example, in the drawing.

The envelope of the received signal is also detected by amplitude detector 20 (as also indicated on the drawing), and the fundamental frequency (which is the difference between the harmonics) is derived by means of filter 22, the components of which are selected to pass only the fundamental frequency. The derived fundamental is then used to excite conventional spectrum generator 24 to produce a spectrum of frequencies similar to the original spectrum appearing at the output of IF amplifier 12, except that the individual lines are relatively equal in level.

The output from spectrum generator 24 is then used to modulate a second output from demodulation oscillator 16 at balanced modulator 26 to produce a double sideband suppressed carrier signal in conventional manner. One sideband of the double sideband suppressed carrier signal produced by balanced modulator 26 is then filtered by filter 28 (the sideband filtered is the one not appearing in the original spectrum appearing at the output of amplifier 12), and the synthesized spectrum then compared with the original spectrum (from amplifier 12) at phase detector 32.

At phase detector 32, each individual spectrum line of one spectrum beats with the corresponding line of the other spectrum to produce a D.C. output error voltage that is proportional to the phase difference therebetween (if in phase coincidence, the D.C. error voltage is zero, of course). This D.C. error voltage is then coupled through filter 34 to the voltage sensitive element of frequency determining network 11 to vary the output frequency of local oscillator 10 until phase coincidence is established at which time the D.C. error voltage has been reduced to zero.

From the foregoing, it should be evident to those skilled in the art that this invention provides an improved receiver system that includes novel means for maintaining the reinsertion oscillator in proper phase for achieving quality product demodulation.

What is claimed as my invention is:

1. A single sideband suppressed carrier receiver system, comprising: means for receiving a single sideband suppressed carrier signal bearing audio modulation that includes at least harmonic frequency components; a high frequency oscillator having a voltage sensitive frequency determining network; mixing means connected to said first named means and said high frequency oscillator to receive the output signals therefrom; an intermediate frequency amplifier connected to receive the output from said mixing means; a demodulation oscillator; product detection means connected to receive the outputs from said intermediate frequency amplifier and said demodulation oscillator and derive the audio modulation components therefrom; means for receiving the output from said intermediate frequency amplifier and developing therefrom a reference spectrum of frequencies that includes the fundamental frequency of said audio modulation and harmonics thereof; and means for comparing said reference spectrum of frequencies with the output of said intermediate frequency amplifier, said means producing an error voltage whenever a phase difference exists between said compared outputs; and means for coupling said error voltage to the voltage sensitive frequency determining network of said high frequency oscillator for varying the phase of the output frequency of said oscillator until said error voltage is substantially reduced to zero.

2. The single sideband suppressed carrier receiver system of claim 1 in which said means for comparing said reference spectrum of frequencies with the output of said intermediate frequency amplifier includes modulation means for receiving the output from said demodulation oscillator and said spectrum of frequencies and modulating the former with the latter, sideband filter means connected to the output of said modulation means, and phase detector means connected to receive the output from said sideband filter means and the output from said intermediate frequency amplifier.

3. The single sideband suppressed carrier receiver system of claim 1 wherein said means for receiving the output from said intermediate frequency amplifier and developing therefrom a reference spectrum of frequencies includes an envelope detector which receives the output of the intermediate frequency amplifier, a filter receiving the output of the envelope detector and tuned to pass only the fundamental frequency of said audio modulation, and a spectrum generator receiving the output of the filter and supplying an input to the modulation means.

4. A single sideband suppressed carrier receiver system, comprising: input means for receiving a single sideband suppressed carrier signal bearing voice modulation that includes at least harmonic frequency components; a voltage controlled high frequency oscillator; a mixer connected to said input means and said high frequency oscillator, the difference output from said mixer including a spectrum of frequencies; an intermediate frequency amplifier connected to receive the output from said mixer; a demodulation oscillator; a product detector connected to said demodulation oscillator and said intermediate frequency amplifier to receive the outputs therefrom and derive the voice modulation components therefrom; an envelope detector connected to said intermediate frequency amplifier; a filter receiving the output of the envelope detector and tuned to pass only fundamental voice frequencies whereby the fundamental frequency of said voice modulation appears at the output of said filter; a spectrum generator connected to the output of the filter for receiving said fundamental frequency and generating a reference spectrum of frequencies that includes said fundamental frequency and harmonics thereof; a balanced modulator for receiving the output from said demodulation oscillator and the output from said spectrum generator; a sideband filter connected to receive the output from said balanced modulator; a phase detector connected to said intermediate frequency amplifier and said sideband filter to compare the spectrum of frequencies from one with the spectrum of frequencies from the other, said phase detector producing a D.C. error voltage whenever the spectrums lack phase coincidence; and means for coupling said D.C. error voltage to said voltage controlled high frequency oscillator to establish phase coincidence.

5. In a single sideband suppressed carrier receiver system having means for receiving an input signal bearing voice modulation that includes at least harmonic frequency components and a mixer stage connected to the means for receiving an input signal and producing a difference output of which includes a spectrum of frequencies, a phase control network including: means for determining the fundamental frequency of voice modulation connected to the output of said mixer stage; means responsive to said determined fundamental frequency for generating a synthesized spectrum of frequencies connected to the means for determining the fundamental frequency; and means for comparing said synthesized spectrum of frequencies with said spectrum of frequencies appearing at the output of said mixer stage with means for comparing said synthesized frequency connected to said mixer stage and to means responsive to said determined fundamental frequency, said means for comparing said synthesized spectrum producing an error output signal when the phases of the two input signals do not coincide.

6. The phase control network of claim 5 wherein said means for determining the fundamental frequency of voice modulation includes an envelope detector and a filter tuned to pass only the fundamental frequency of voice modulation.

7. The phase control network of claim 5 wherein said last named means includes a phase detector.

References Cited by the Examiner

UNITED STATES PATENTS 2,999,154 9/1961 Krause ------------- 325—329

KATHLEEN H. CLAFFY, *Primary Examiner.*

R. S. BELL, *Assistant Examiner.*